Dec. 23, 1969     H. W. AVERY     3,484,968
PNEUMATIC READOUT INDICATOR
Filed July 28, 1967     2 Sheets-Sheet 1
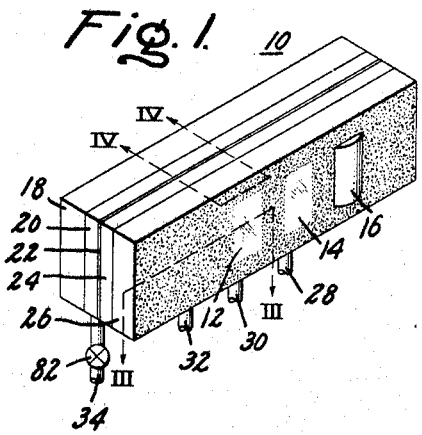
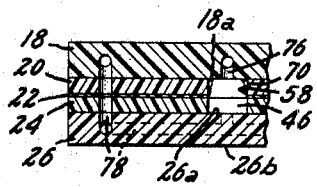
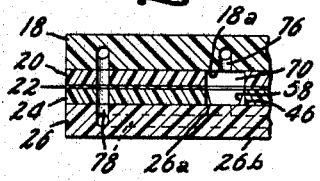
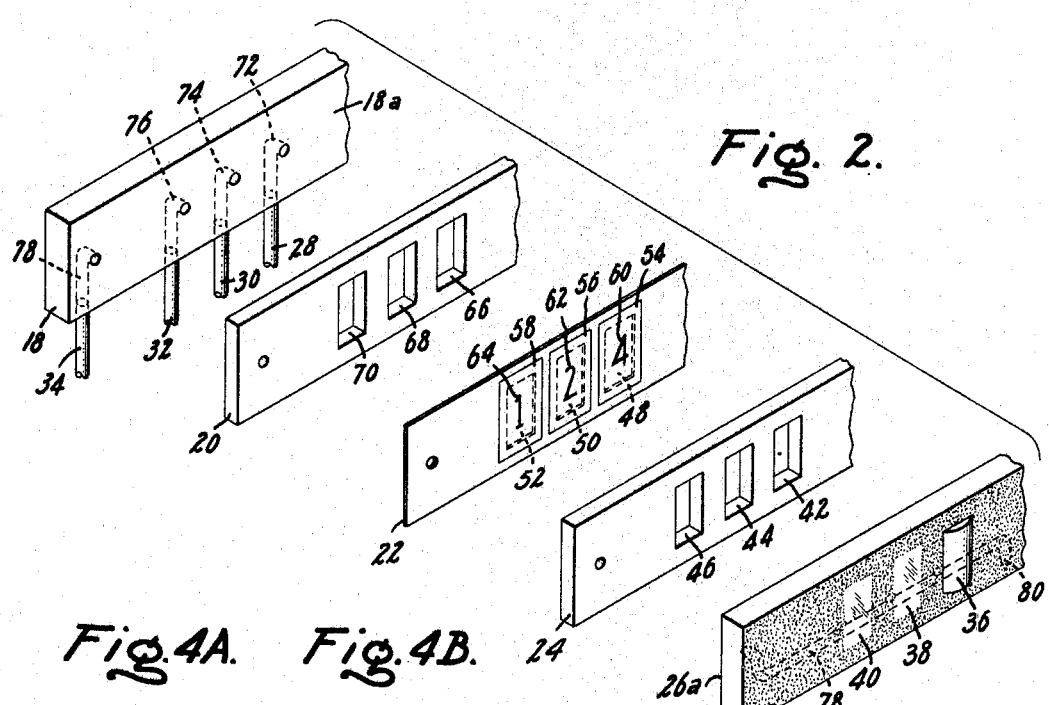
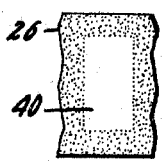
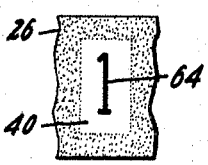
Inventor:
Howard W. Avery,
by Paul A. Frank
His Attorney.

Dec. 23, 1969  H. W. AVERY  3,484,968
PNEUMATIC READOUT INDICATOR
Filed July 28, 1967  2 Sheets-Sheet 2
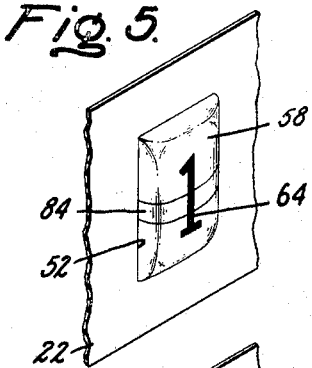
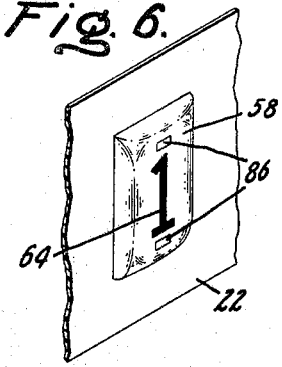
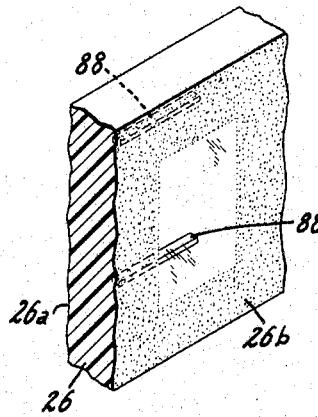
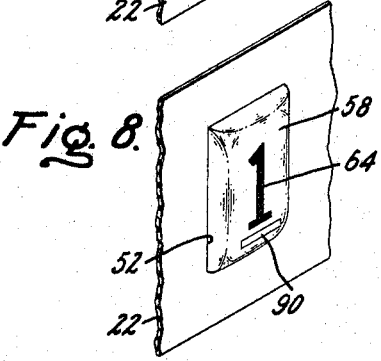
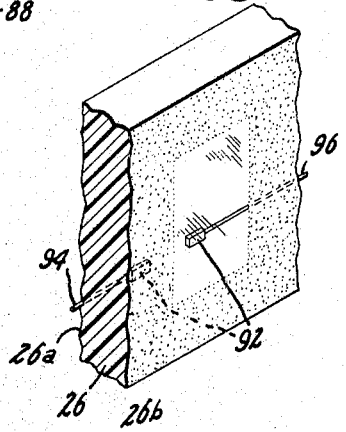
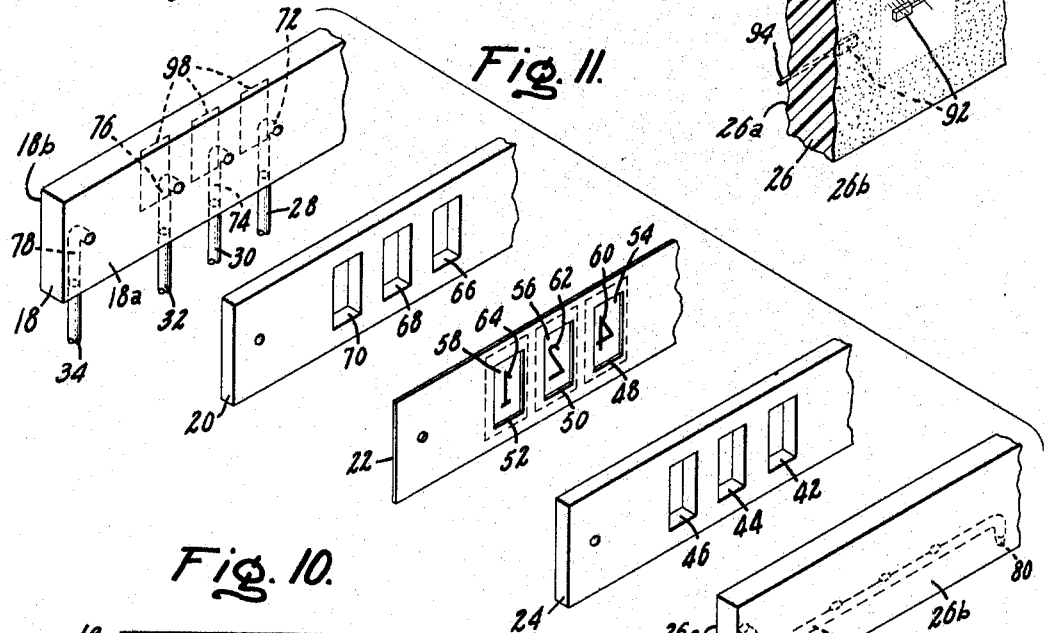
Inventor:
Howard W. Avery,
by Paul A. Frank
His Attorney

United States Patent Office 3,484,968
Patented Dec. 23, 1969

3,484,968
PNEUMATIC READOUT INDICATOR
Howard W. Avery, Schenectady, N.Y., assignor to General Electric Company, a corporation of New York
Filed July 28, 1967, Ser. No. 656,801
Int. Cl. G09f 11/00
U.S. Cl. 40—28                                         3 Claims

ABSTRACT OF THE DISCLOSURE

A pneumatic readout device for producing a symbolic indication in response to a fluid pressure signal. A diaphragm of flexible material, having a symbolic representation thereon is spaced a short distance from a translucent window plate. A fluid pressure signal when communicated to a chamber adjacent the diaphragm forces the portion of the diaphragm having the symbol against the rear surface of the translucent plate to make this symbol visible through the plate. A biasing pressure may return the diaphragm to its non-indicating position. Means may also be provided to effect bistable operation of the indicator.

---

This invention relates to the field of symbol readout devices and, in particular, regards those initiated by a fluid pressure signal.

It is highly desirable in many applications to have a device providing a symbol readout in response to a fluid pressure signal. In the past, fluid readout devices have necessitated either a complicated and/or expensive structure wherein the fluid pressure signal was converted to an electrical signal to provide a readout, the indicating means necessitated a substantially large pressure signal to effect a sizable moving of the indicating means or relied upon gravity or spring forces for indication actuation, or the fluid pressure signal had to displace opaque liquid to effect indication. Such prior art devices were generally quite large and generally biased in either the indicating or non-indicating position. However, in many fields, particularly those of pneumatic control or fluid amplifier apparatus, a large number of miniaturized symbol readout indicators may be needed when the fluid circuitry is extensive and possibly quite complicated. Also, in some applications, such as moving vehicles, an insensitivity to accelerations and/or movable orientation is needed. Thus, it is highly desirable to have an indicating device which is inexpensive to manufacture, quite small in size and insensitive to placement or dynamics. In many applications, such as where the pressure signal exists for only a short time it is also desirable to have a bistable indicator that once initiated will continue to show an indication until reset.

Accordingly, it is an object of the subject invention to provide an inexpensive pneumatic readout device which is capable of miniaturization and is insensitive to orientation or acceleration.

A further object of the subject invention is to provide such a readout device which is bistable in operation.

To fulfill the above-stated objects, the subject invention provides a pneumatic readout device consisting of a flexible diaphragm such as a membrane spaced a small distance from the rear surface of a translucent indicating plate and means to communicate a pressure signal to the diaphragm to force the symbolic indication against the rear surface of the translucent plate. This allows the symbolic representation to be visible through the translucent plate. Because a translucent indicating plate is used, the symbolic indication is not visible through the plate except when the symbolic indication is contacting the rear surface of the plate. The diaphragm may be electrostatically charged so that when a pressure signal causes the diaphragm to contact the rear surface of the translucent plate, the electrostatic charge thereon holds the diaphragm against the plate until a resetting bias pressure is applied to the diahragm to return it to its non-indicating position. This effects a bistable mode of operation for the indicator.

The subject matter which I regard as my invention is particularly pointed out and distinctly claimed in the concluding portion of this specification.

My invention, however, together with further objects and advantages thereof, may best be understood by reference to the following description taken in connection with the accompanying drawings in which:

FIGURE 1 is a perspective view of a pneumatic readout assembly embodying the subject invention;

FIGURE 2 is an exploded perspective view of the pneumatic readout device shown in FIGURE 1;

FIGURE 3A is a sectional view of the pneumatic readout device shown in FIGURE 1 taken along the plane indicated III—III when the device is in a non-indicating position;

FIGURE 3B is a sectional view of the pneumatic readout device of FIGURE 1 taken along the plane indicated III—III when the device is in an indicating position;

FIGURE 4A is a front view of the device shown in FIGURE 1 taken along the plane indicated IV—IV when the indicator is in a non-indicating position;

FIGURE 4B is a front view of the device shown in FIGURE 1 taken along the plane indicated IV—IV when the device is in an indicating position;

FIGURE 5 is a perspective view of another bistable flexible membrane embodiment which uses a buckling member;

FIGURE 6 is a perspective view of a third bistable flexible membrane embodiment having magnetically attractable material thereon;

FIGURE 7 is a perspective view of a portion of a front translucent panel embodiment having magnets placed therein for use with the membrane embodiment shown in FIGURE 6;

FIGURE 8 is a perspective view of another flexible membrane embodiment having electrically conductive strips thereon;

FIGURE 9 is a perspective view of a portion of a front panel having a plurality of contacts thereon for use with the membrane embodiment shown in FIGURE 8;

FIGURE 10 is a partial top view of an indicating unit using the membrane and front panel embodiments shown in FIGURES 8 and 9; and FIGURE 11 is an exploded perspective view of a negative signal pressure pneumatic readout device.

In FIGURE 1 an assembled pneumatic readout indicator 10 is shown having three indication units 12, 14, 16. The indicator assembly 10 is comprised of a plurality of layers 18, 20, 22, 24, 26, preferably of plastic material, and a plurality of fluid inlet conduits 28, 30, 32, 34, one for each of the indicator units 12, 14, 16 and one to provide biasing fluid.

The assembly 10 can best be seen by reference to FIGURE 2 wherein the parts are shown in exploded form. The front indication plate 26 has a substantially translucent surface with the exception of clear windows 36, 38, 40 in the front surface thereof. The translucent surface of front plate 26 may be formed by sandblasting the surfaces and masking off the clear windows only on the front surface. Although it is only necessary to have the rear surface 26a of the front plate translucent, it is preferable that the front surface 26b also be translucent except for the clear windows so as to provide better definition of the symbolic indication through the window for each of the indicator units. The second plate 24, which is assembled adjacent and contiguous to front plate 26, is relatively thin, on the order of 0.06 inch, and has a plurality of cutout portions 42, 44, 46 therein corresponding to the windows of front plate 26.

The third contiguous layer is a thin support plate 22 having apertures 48, 50, 52 corresponding to the apertures of second plate 24 and the windows of front plate 26. A flexible membrane 54, 56, 58 which acts as a diaphragm or bellows covers each of the apertures 48, 50, 52, respectively. The membranes, which are preferably of a thin flexible material able to hold a static charge, such as polyvinyl chloride, are somewhat loosely placed over the apertures so as to allow a small, but significant movement of a major portion of the membrane forward toward the front plate and rearward toward the back plate of the device. The amount of movement needed is determined by the thickness of the second and fourth plates. A desired symbol 60, 62, 64 is affixed to each of the respective membranes substantially centrally thereof. The symbol may be of any form, such as a number, letter, drawing or picture so as to provide any desired indication.

A fourth layer 20 is a plate substantially similar to second layer 24, and has apertures 66, 68, 70 aligned with the windows, apertures and membranes of the first three layers.

The fifth layer 18 is a rear plate 18 having passageways therein connected to fluid inlet pipes 28, 30, 32, 34. These passageways include fluid signal passageways 72, 74, 76 which serve to communicate fluid pressure signals coming from the respective fluid pressure signal inlet pipes 28, 30, 32 to the signal chambers partially defined by apertures 66, 68, 70 in the fourth plate 20 adjacent membranes 54, 56, 58, respectively.

Also provided in the indicator assembly 10 is a fluid biasing passageway 78 which extends through all layers of assembly 10 and serves to connect fluid biasing inlet pipe 34 to all of the biasing chambers partially defined by apertures 42, 44, 46 in the second plate and to a vent 80 having a restriction therein.

All of the layers 18, 20, 22, 24, 26 of the device are fastened together in substantially contiguous, fluid-tight relationship for assembly by means such as gluing.

Although it is preferable that all materials are made of a plastic or glass material the only major limitations on materials are the characteristics specified for the membrane material and for the light transmitting properties of the front plate, and that front and back plates 18, 26 be of a dielectric material or coated therewith so that the static charge on the membranes will not be dissipated.

The operation of the pneumatic readout indicator 10 can best be understood by reference to FIGURES 3A, 3B, 4A, and 4B. FIGURES 3A and 3B are top sectional views of one indicator unit 12 and are each the section of the embodiment shown in FIGURE 1 taken along the plane denoted III—III. FIGURES 4A and 4B are each the section of the FIGURE 1 embodiment taken along the plane denoted IV—IV and show the view through the window of the indicator units shown in FIGURES 3A and 3B, respectively. The A notation for the figures denotes that the view shown in the figures is of the unit in a non-indicating position and the B denotes, in an analogous manner, that the view shown is of the unit in an indicating position.

For operation of one of the indicating units 12 a static charge must first be placed on membrane 58. It has been found that by using a material such a polyvinyl chloride a static charge is inherently present in the material upon application and will remain there substantially indefinitely unless purposely dissipated.

The flow of biasing fluid is controlled by means such as a valve 82 in the input to the biasing passageway 78. The biasing fluid puts a positive pressure in the biasing chamber defined at least in part by the apertures 46 so as to force a substantial portion of the membrane 58 against the front surface 18a of the rear plate 18. As the rear plate 18 is made of a dielectric material the static charge of the membrane will cause the membrane to maintain contact therewith without dissipating the static charge on the membrane.

This non-indicating position is shown in FIGURE 3A. As the symbol 64 is a small, but substantial distance from the translucent surface 26a of the front plate, light reflected from the symbol 64 is almost completely scattered by the translucent surface so that the symbol 64 is not visible through the window 40, as shown in FIGURE 4A. The biasing pressure is relieved by closing valve 82 since the terminal end of the biasing passageway 78 is vented to the atmosphere.

When a fluid pressure signal is received via the passageway 76 a positive pressure is built up in a signal chamber at least partially defined by aperture 70, thereby forcing membrane 58 to contact the rear surface 26a of front plate 26 as shown in FIGURE 3B. The portion of the membrane 58 contacting surface 26a includes the symbol 64 affixed thereto. Due to the contiguous relationship of symbol 64 to translucent surface 26a, only a very small, insignificant portion of the light reflected from symbol 64 is scattered by translucent surface 26a. Therefore, symbol 64 is clearly visible through window 40, as shown in FIGURE 4B, when the indicator is in the indicating mode. Due to the static charge on membrane 58, it will remain in contact with rear surface 26a which is also a dielectric material, even though the pressure signal via passageway 76 has ceased.

The indicator may then be reset to the non-indicating position by opening valve 80 to allow biasing fluid to force membrane 58 against front surface 18a of rear plate 18. However, it should be noted that if the fluid pressure signal remains, opening of fluid biasing valve 80 will not affect the position of the membrane and hence the indication as the biasing pressure is in most all cases relatively small because it is vented to atmosphere.

It has been found that the membrane reliably responds to a pressure differential of two inches of $H_2O$, thus allowing the indicator to be quite sensitive if desired. For a sensitivity of two inches of $H_2O$, it would be desirable to have the biasing pressure slightly more than sensitivity pressure, such as 2.5–3.0 inches of $H_2O$, to assure reset, but not affect any substantial pressure signal.

The action of the readout indicator therefore is bistable, i.e., will remain in either the indicating or non-indicating position until a positive signal or biasing pressure is received.

A number of additional embodiments concerning means for making the indicating unit act bistable, other means for providing indication, and adaptation of the subject invention for response to a negative pressure signal are described below.

In FIGURE 5, an embodiment of the flexible membrane 58 is shown which uses a bistabilization means other than an electrostatic charge. The bistabilization means in this embodiment is a strip of material 84 which when its ends are restricted exhibits lateral buckling bistabilized modes. This material may conveniently be a piece of plastic material possessing a lateral buckling characteristic whose thickness may be an order of magnitude greater than that of the membrane. Strip 84 may be positioned in any orientation (preferably widthwise or heightwise) across aperture 52 and is attached to membrane 58. The ends of strip 84 are rigidly attached to support plate 22, and the length of strip 84 is somewhat greater than the width (or height) of aperture 52 so that strip 84 and hence the attached membrane 58 will be stable only when the strip is buckled outwardly or inwardly. Thus, for a positive pressure signal the strip 84 will be buckled outwardly thereby causing the membrane to be forced against the translucent surface of the front plate. Similarly, a positive biasing pressure will cause strip 84 to buckle inwardly forcing the membrane away from the translucent surface.

Another bistabilization embodiment is shown in FIGURES 6 and 7. In this embodiment one or more pieces 86 of a magnetically attractable material such as a thin piece of iron, is affixed to flexible membrane 58, as shown in FIGURE 6. A corresponding number of magnets 88 (either permanent magnets or electromagnets) are embedded in the front translucent plate 26 in alignment with the piece or pieces 86 so that when a positive pressure forces the membrane against the translucent surface 26a of the front plate, the membrane remains in contact therewith until a biasing pressure forces the membrane and hence pieces 86 away from rear surface 26a and magnets 88. Similar magnets may be placed on the rear wall 18, if desired.

In FIGURES 8, 9, and 10, an embodiment is shown which provides another type of indication. As shown in FIGURE 8, an electrically conductive strip 90, such as a piece of copper, aluminum, or iron foil, is affixed to flexible membrane 58, preferably in either a widthwise or heightwise extending orientation. The pair of contacts 92 are positioned on rear surface 26a of front plate 26 in alignment with portions of the conductive strip 90. Conductors 94, 96 are connected to terminals 92 and to an electrical indication means not shown. Therefore, when a positive pressure signal occurs the membrane 58 will be forced against rear surface 26a of the front plate, strip 90 connecting the two terminals 92, as shown in FIGURE 10, thereby closing the circuit in the electrical indication means to produce an electrical signal. The electrical indication circuit, which is not shown, may be any of a large number of varieties well known in the art. An example would be a battery and light or buzzer connected in series with conductors 94, 96 such that when strip 90 completes the circuit, a light bulb is illuminated or a buzzer sounds to provide indication.

An alternate way of using the same basic embodiment is to position terminals on the front surface of the rear plate so that the electrical indication circuit is closed except when a positive pressure signal is received. The opening of this electrical indication circuit may cause a light to be shut off or may actuate a relay to allow a positive type of indication such as lighting a light bulb or ringing a bell. Also, this electrical indication setup may be in addition to the visible indication means shown in FIGURES 1-4. Also, it may be desirable to provide bistabilization means such as that of the embodiments shown in FIGURES 1-7.

Another possible embodiment to provide an electrical indication, not shown, is to provide an electrical coil disposed about the aperture in one of spacer blocks 20, 24 and affixing to the membrane a piece of material such as an electrical conductor which on movement through the field generated by the electrical coil will induce an electrical indication through the circuit of the coil.

Also, as shown in FIGURE 11, it is possible to modify the indicator structure shown in FIGURES 1 and 2 so that the device produces a symbolic indication for a negative pressure signal rather than positive pressure signal. This can be accomplished by a very slight modification. Either rear plate 18 would have to be interchanged with front plate 26, or, as shown in FIGURE 11, rear plate 18 could become a front plate by making the surface thereof translucent except for window areas 98 on the outside surface 18b of the rear plate aligned with symbols 60, 62, 64 on the membranes. Of course, in the embodiment shown in FIGURE 11, symbols 60, 62, 64 should be affixed to the surface of membranes 54, 56, 58 closest to the rear plate, and the indicator would be viewed through rear plate 18. For either alternative, the biasing pressure would be negative, i.e., a vacuum, to reset the membrane.

The negative pressure indicator functions in a similar manner to the positive pressure indicator. A negative pressure signal causes the membrane to move into contact with the adjacent surface of the new indicator plate so as to allow the symbolic indication to be visible. The negative biasing pressure, in the absence of a negative signal pressure, resets the indicator so that the membrane is pulled away from the indicator plate and is not visible therethrough. Of course, the embodiments discussed above to provide bistabilization means and electrical indication can be used with the negative pressure indicator embodiment shown in FIGURE 11.

Also, it should be noted that the reset biasing system, which is shown to reset all of the indicator units at the same time in a given indicator module, could obviously be modified to provide individual reset biasing for each of the indicator units independent of the other units.

It is obvious that any reasonable number of indicating means may be combined in a single unitary structure. If extreme miniaturization is desirable, the windows in the front plate may have a lens molded integral therewith or have a plastic lens cemented to the flat surface so as to permit an extremely small size indicator unit with a reasonably sized visible indication, as shown by the lens window 36 of the indicating unit 16 in FIGURES 1 and 2. Also, any combination of bistabilization means and indicating means may be used.

In actual operation, the distance between front surface 18a of rear plate 18 and rear surface 26a of front plate 26 may be as little as 0.12 inch to allow reliable operation of the indicator with a clear distinction between the indicating and non-indicating modes of the device. Also, the device operates reliably with pressure differential of as little as two inches of water while yet being able to withstand static pressures with quite large intensities for substantial periods of time.

Thus, the subject invention provides a pneumatic readout indicator which is simple, economical, reliable, easily capable of being miniaturized, not sensitive to friction or accelerations, does not rely upon spring or gravity forces, does not extract continuous flow from the pressure signal source, and requires only a very small charging flow.

The appended claims are intended to cover all changes and modifications of the examples of the invention herein chosen for purposes of the disclosure, which do not depart from the true spirit and scope of the invention.

What I claim as new and desire to secure by Letters Patent of the United States is:

1. A device for providing an indication in response to a fluid pressure signal comprising:
    a front plate of dielectric material,
    a thin flexible diaphragm of dielectric material capable of holding a static electric charge thereon spaced from the rear surface of the said front plate,
    means for defining a signal chamber adjacent one surface of said diaphragm,
    indication means, at least a portion of which is attached to said diaphragm, whereby said diaphragm may contact the rear surface of said plate and adhere thereto by means of said static electric charge thereon to provide an indication in response to a fluid pressure signal,
    means for communicating a fluid pressure signal to said signal chamber, and
    means for resetting said diaphragm.

2. A device as in claim 1 wherein:
    said front plate is substantially translucent; and
    said indication means is an indication symbol affixed to said diaphragm to provide a visual symbol readout through said front plate in response to a fluid signal pressure.

3. A device as in claim 1 wherein:
    said diaphragm includes a strip of electrically conductive material:
    said front plate includes a pair of spaced terminals in alignment with portions of said strip; and said device further comprises electrical conductors connecting said terminals to an indicator.

References Cited

UNITED STATES PATENTS 3,106,794  10/1963  Le Goff.
3,346,977  10/1967  Rydstrom _____ 40—37 X
3,372,501  3/1968  Greene.

EUGENE R. CAPOZIO, Primary Examiner

WENCESLAO J. CONTRERAS, Assistant Examiner